(12) United States Patent
Honkala et al.

(10) Patent No.: US 7,092,709 B1
(45) Date of Patent: Aug. 15, 2006

(54) HANDOVER OF A MOBILE STATION FROM AN INTERNAL CELLULAR COMMUNICATION SYSTEM TO AN EXTERNAL CELLULAR COMMUNICATION SYSTEM

(75) Inventors: Hannu Honkala, Tampere (FI); Timo Hanninen, San Diego, CA (US); Roy Mickos, Tampere (FI); Kai Narvanen, Pirkkala (FI); Markku Rautiola, Tampere (FI); Pekka Rissanen, Tampere (FI); Tapio Siik, Lempäälä (FI); Petri Uosukainen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/980,973

(22) PCT Filed: Apr. 19, 2000

(86) PCT No.: PCT/EP00/03756

§ 371 (c)(1),
(2), (4) Date: Feb. 21, 2002

(87) PCT Pub. No.: WO00/67514

PCT Pub. Date: Nov. 9, 2000

(30) Foreign Application Priority Data

Apr. 30, 1999 (GB) .................................. 9910115.6

(51) Int. Cl.
*H04Q 7/20* (2006.01)
(52) U.S. Cl. ............... 455/432.1; 370/321; 370/331
(58) Field of Classification Search ............. 455/436, 455/439, 435.1, 422.1, 432.1; 370/331, 355, 370/356, 321
See application file for complete search history.

(56) References Cited

U.S. PATENT DOCUMENTS

| 4,737,978 | A | 4/1988 | Burke et al. ............... 379/60 |
| 4,829,554 | A * | 5/1989 | Barnes et al. ............ 455/432.1 |
| 6,507,567 | B1 * | 1/2003 | Willars ..................... 370/321 |
| 6,519,235 | B1 * | 2/2003 | Kim et al. ................. 370/331 |

FOREIGN PATENT DOCUMENTS

| EP | 0 725 552 A2 | 8/1996 |
| EP | 0 883 266 A2 | 12/1998 |
| WO | WO 98/25431 | 6/1998 |

\* cited by examiner

Primary Examiner—William D. Cumming
(74) Attorney, Agent, or Firm—Cohen, Pontani, Lieberman & Pavane

(57) ABSTRACT

A method of handing off a mobile station (MS B) from an internal cellular communications network to an external cellular communications network having a network controller, the method comprising: allocating at least one cell of the internal cellular network as a border cell (E); detecting the movement of said mobile station (MS B) into said border cell (E); generating an advance hand-off request in accordance with a prediction algorithm which uses a set of predetermined parameters associated with said mobile station (MS B) and determines when a hand-off is likely to be required; and responsive to said advance hand-off request setting up a communication channel in the external cellular communications network for use by said mobile station (MS B) when an actual hand-off request is made, wherein said external network and said internal network is a packet switched network.

15 Claims, 9 Drawing Sheets

# HANDOVER OF A MOBILE STATION FROM AN INTERNAL CELLULAR COMMUNICATION SYSTEM TO AN EXTERNAL CELLULAR COMMUNICATION SYSTEM

CROSS-REFERENCE TO RELATED APPLICATION

This is a U.S. national stage of application No. PCT/EP00/03756, filed on Apr. 19, 2000, which claims priority on the following application: Country: Great Britain, Application No.: 9910115.6, Filed: Apr. 30, 1999.

FIELD OF INVENTION

The present invention is related to handovers in a communication system and particularly, but not exclusively, to mobile telephone station handovers in an IP-based telecommunications network.

BACKGROUND TO INVENTION

Prior art office-based communications systems usually operate conventional fixed-line telephone units linked via an internal switchboard or PBX (private branch exchange.) Such fixed-line systems are able to provide relatively high voice quality. However, user mobility is severely impaired.

The advent of digital mobile technologies such as GSM, however, means that mobile systems can now provide equivalent, if not higher, voice quality than fixed-line systems. Mobile systems also allow greater freedom of movement for the user within the office than do fixed-line systems.

WIO (Wireless Intranet Office) is a proprietary communications system developed by the applicants which introduces the concept of utilising mobile telephone units, such as conventional GSM mobile stations, in an office environment. The system makes use of a known concept called Internet Telephony or Voice-over-IP.

Voice-over-IP is a technology which allows sound, data and video information to be transmitted over existing IP-based Local or Wide Area Networks or the Internet. The technology thus provides for convergence and integration of three different media types over the same network.

Prior to the advent of Voice-over-IP, offices often operated three separate networks for the transmission of these media types. As indicated above, fixed-line telephone systems coupled to an in-house PBX provided for voice communication, an office-based LAN or Intranet (i.e a packet-switched internal network), comprising computer terminals linked via network cards and under the control of a server station, provided for the transmission of "conventional" computer data and video cameras linked to monitors via fixed line or remote transmission link provided for video communication.

Voice-over-IP effectively combines these three media types such that they can be transmitted simultaneously on the same packet-switched network or IP-router throughout the office environment and beyond the confines of the office.

In order to provide for such media convergence, Voice-over-IP often uses a specific ITU (International Telecommunication Union) standard protocol to control the media flow over the Intranet. One common standard protocol used in Voice-over-IP systems, and the one used in the WIO system, is termed H.323.

H.323 is an ITU standard for multimedia communications (voice, video and data) and allows multimedia streaming over conventional packet-switched networks. The protocol provides for call control, multimedia management and bandwidth management for both point-to-point (2 end-users) and multipoint (3 or more end-users) conferences. H.323 also supports standard video and audio codecs (compression/decompression methods such as MPEG) and supports data sharing via the T.120 standard.

Furthermore, H.323 is network, platform and application independent allowing any H.323 compliant terminal to operate in conjunction with any other terminal.

The H.323 standard defines the use of three further command and control protocols:
a) H.245 for call control;
b) Q.931 based protocol for call signalling; and
c) The RAS (Registrations, Admissions and Status) signalling function.

The H.245 control protocol is responsible for control messages governing the operation of the H.323 terminal including capability exchanges, commands and indications. Q.931 is used to set up a connection between two terminals. RAS governs registration, admission and bandwidth functions between endpoints and gatekeepers (defined later).

For a H.323 based communication system, the standard defines four major components:
1. Terminal
2. Gateway
3. Gatekeeper
4. Multipoint Control Unit (MCU)

Terminals are the user end-points on the network, e.g a telephone or fax unit or a computer terminal. All H.323 compliant terminals must support voice communications, but video and data support is optional.

Gateways connect H.323 networks to other networks or protocols. For an entirely internal communications network, i.e. with no external call facility, gateways are not required.

Gatekeepers are the control centre of the Voice-over-IP network. It is under the control of a gatekeeper that most transactions (communication between two terminals) are established. Primary functions of the gatekeeper are address translation, bandwidth management and call control to limit the number of simultaneous H.323 connections and the total bandwidth used by those connections. An H.323 "zone" is defined as the collection of all terminals, gateways and multipoint-control units (MCU—defined below) which are managed by a single gatekeeper.

Multipoint Control Units (MCU) support communications between three or more terminals. The MCU comprises a multipoint controller (MC) which performs H.245 negotiations between all terminals to determine common audio and video processing capabilities, and a multipoint processor (MP) which routes audio, video and data streams between terminals.

The conventional Voice-over-IP system described herein above normally utilise standard fixed-line telephone systems which are subject to the disadvantages outlined above, namely the lack of mobility and the lack of user commands.

The WIO concept takes Voice-over-IP further in that it provides for the use of conventional mobile telephone units, such as GSM mobile stations, within the Voice-over-IP system. To provide for such mobile communications within an intra-office communication network, WIO combines known Voice-over-IP, as described above, with conventional GSM-based mobile systems.

Thus, intra-office calls are routed through the office intranet and extra-office calls are routed conventionally through the GSM network. Such a system provides most or all of the features supported by the mobile station and the network such as telephone directories, short messaging, multiparty services, data calls, call barring, call forwarding etc. WIO, therefore, provides for integrated voice, video and data communications by interfacing an H.323-based voice-over-IP network with a GSM mobile network.

The WIO system is a cellular network, similar to the conventional GSM network and is divided into H.323 Zones as described above. One H.323 Zone may comprise a number of (GSM) radio cells. Two or more H.323 zones may be contained within an administrative domain. The allocation of H.323 zones to an administrative domain is an issue primarily concerning billing and is therefore not relevant to this invention.

Given the cellular nature of the WIO system, a major issue to be solved is that of handovers. As a mobile station moves from one cell to another it reports its location to a base station or equivalent controller. When it moves from one zone to another, a handover is required of the call to another controller. A similar consideration applies to mobile stations in the conventional GSM network.

In such conventional GSM systems, the need for a handover of a mobile station to a different cell of the network is normally determined by a number of parameters but predominantly including the mobile station measuring the strength of signals transmitted from several base transceiver stations.

During the time that it is in a particular cell, the mobile station continuously receives signals from several base transceiver stations in adjacent cells and compares the signal strength of the signals received from each of these stations. If the level of a signal transmitted by a base transceiver station, located in a different cell from that of the mobile, reaches a certain threshold level T1 in relation to that of the base transceiver station located in the mobile station's current cell, the WIO network may determine that a handover to that cell is required and will issue a handover request to the network controller (mobile services switching centre).

In a similar manner, a mobile station operating in the WIO system is able to compare the signal strengths of the signals received by several base stations, in different cells, in the network.

However, added complexities arise for handovers in the WIO system since a mobile unit operating therein must not only be able to move between cells within the WIO system, but also between zones and even between the WIO system itself and an external GSM network.

It can be seen, therefore, that there are several different types of handovers which may need to be executed in the normal operation of a WIO system. These types of handovers are:

a) The handover of a mobile from one WIO cell to another.
b) The handover of a mobile from one WIO zone to another.
c) The handover of a mobile from a cell within the WIO system to a cell within an external GSM system.
d) The handover from a cell within an external GSM system to a cell within the WIO system.

A particular problem to be solved when implementing a WIO system is that outlined in item c) above; that is, to provide for handover of a mobile station from the WIO system to an external network such as GSM, particularly in situations where the initial call was a WIO internal call (i.e. the call was set up in the WIO system itself).

As will be described later, in such a situation, the initial call set up is made entirely within the WIO system by the system components. No information regarding the call or the mobile stations involved in the call is transmitted outside of the WIO system.

It is apparent, therefore, that any external network, for example a GSM network, and in particular the main network controller within that network such as the Mobile Switching Centre (MSC), are entirely unaware of the existence of the call. No information regarding the identity of the calling mobile stations, the call channels or the location of the calling mobile stations is received by the main network controller.

As a consequence, therefore, if one of the calling mobile stations moves out of a cell of the WIO system and into a cell of an external network, the main network controller of the external network will be unable to perform a handover until such time as it has established all of the information required to perform the handover, such as those listed above. The establishing of this information takes a relatively long time during which the mobile station and the terminal with which it is in communication are continuously transmitting and receiving data packets. If the time to execute the handover is too long, data packets will be lost and voice communication will be significantly impaired.

In order to reduce the time needed to execute a handover of a mobile station to an external network and thus to prevent such unwanted impairment of the call, a method is needed to provide for early notification of an impending handover to the external main network controller such that the main network controller is able to commence set up of the call handover in advance of the handover request actually being made.

SUMMARY OF INVENTION

According to one aspect of the present invention there is provided a method of handing off a mobile station from an internal cellular communications network to an external cellular communications network having a network controller, the method comprising: allocating at least one cell of the internal cellular network as a border cell; detecting the movement of said mobile station into said border cell; generating an advance hand-off request in accordance with a prediction algorithm which uses a set of predetermined parameters associated with said mobile station and determines when a hand-off is likely to be required; and responsive to said advance hand-off request setting up a communication channel in the external cellular communications network for use by said mobile station when an actual hand-off request is made, wherein said external network is a mobile communications network and said internal network is a packet switched network.

According to a further aspect of the present invention there is provided a method of handing off a mobile station from an internal cellular communications network to an external cellular communications network having a network controller, the method comprising: allocating at least one cell of the internal cellular network as a border cell; detecting the movement of said mobile station into said border cell; generating an advance hand-off request in accordance with a prediction algorithm which uses a set of predetermined parameters associated with said mobile station and determines when a hand-off is likely to be required; and responsive to said advance hand-off request setting up a communication channel in the external cellular communications network for use by said mobile station when an actual hand-off request is made, wherein said hand-off advance request is issued in packet format via a packet communication path from the internal network to said network controller of said external network.

According to a further aspect of the present invention there is provided a network controller for use in an internal cellular communications network said internal network is a packet switched network and comprises a plurality of cells and including at least one border cell adjacent cells of an external mobile cellular communications network having an external network controller, the internal network controller comprising: means for detecting the movement of said mobile station into said border cell; means for selectively issuing a hand-off advance request advising said network controller of said external network that a hand-off is likely to be required in accordance with a predetermined algorithm which uses a set of predetermined parameters associated with said mobile station; and means for setting up a communication channel in the external communications network for use by said mobile station when an actual hand-off request is made.

According to a further aspect of the present invention there is provided a network controller for use in an internal cellular communications network said internal network is a packet switched network and comprises, a plurality of cells and including at least one border cell, said at least one border cell being adjacent cells of an external mobile cellular communications network having an external network controller, the internal network controller comprising: means for detecting the movement of said mobile station into said border cell; means for selectively issuing a hand-off advance request advising said network controller of said external network that a hand-off is likely to be required in accordance with a predetermined algorithm which uses a set of predetermined parameters associated with said mobile station; and means for setting up a communication channel in the external communications network for use by said mobile station when an actual hand-off request is made.

In particular, where the internal cellular communications network comprises a base transceiver station in RF communication with said mobile station, up-link and/or down-link timing advance information may be used to estimate the movement of said mobile station to assist in predicting when to issue a hand-off advance request.

When a hand-off request is issued by said mobile station, hand-off may be implemented in accordance with a communication channel which has been set up by the network controller of said external network responsive to the hand-off advance request.

Thus, call set up to the surrounding system may be begun some time before the actual demand for handover.

Thus, according to the embodiment of the invention described herein, when a local telephone call is going on between two subscribers in a WIO location area, it is possible for subscribers to make a handover to a surrounding public GSM network. A call set-up is done some time before the actual demand for the handover. A special prediction for the demand is calculated in the local WIO system and handover preparation is started early enough for the MSC of the GSM network to make required arrangements for the handover. In the WIO system, some cells are defined as border area cells. A prediction algorithm is used to calculate a demand for handover to the surrounding network. In addition to normal handover parameters like up-link and down-link information, timing advance can be used to estimate a subscriber movement and the need for this kind of handover.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

For a better understanding of the present invention, and to show how the same may be carried into effect, the present invention will now be described in more detail with reference to the accompanying drawings in which.

BRIEF DESCRIPTION OF EMBODIMENTS OF THE PRESENT INVENTION

A WIO system can be provided in an office and operator environment based on an IP (Internal Protocol) based LAN (Local Area Networks) 10 which are operable to carry packet form data. One or more mobile stations (MS) 1 communicate, i.e. transmit signals to and/or receive signals from, a base transceiver station (BTS) 2. The base transceiver station 2 used in the WIO system is similar to base transceiver stations used in conventional GSM mobile communications systems in that it is connected to, and operates in conjunction with, a controller. In a conventional GSM system, the controller is termed a base station controller (BSC); in WIO, however, the controller is represented by an GSM Radio Access Gateway 3, the function of which will be described later.

The base transceiver station 2 therefore receives signals transmitted by the mobile unit 1 and forwards them to the GSM Radio Access Gateway 3. The GSM Radio Access Gateway 3 is also connected to the IP-based LAN 10.

A WIO Gatekeeper (WGK) 4 is connected to the IP-based LAN 10.

WIO allows for the use of mobile telephone in the office environment to make both intra- and extra-office calls. The functions of each of the components of FIG. 1 will now be described in more detail.

The GSM Radio Access Gateway 3 performs similar functions to that of a base station controller in a conventional GSM network such as the management of radio resources and channel configuration and the handling of the Base transceiver station configuration. However, the GSM Radio Access Gateway 3 also provides conversion from GSM voice data to packet-based data suitable for transmitting on the packet-based LAN.

The WIO Gatekeeper 4 is the main controller of the WIO system. It is responsible for all of the functions which the H.323 protocol defines to its gatekeeper, including call management and call signalling. The WIO Gatekeeper is able to manage the main different call types such as voice, data, facsimile and conference calls which can be established between a mobile station, a computer terminal and a normal telephone in any combination.

An GSM gateway 8 handles the communication between the WIO environment and the GSM network. It is connected to the Mobile Switching Centre (MSC) of the GSM network. From the MSC viewpoint, the WIO appears to be a conventional base station controller.

The telephone calls managed by the WIO system can be divided into internal calls and external calls. Internal calls are those calls where both parties to the call are located within the WIO system, and external calls involve any telecommunication terminal which is not located within the WIO system.

Figure 1A:
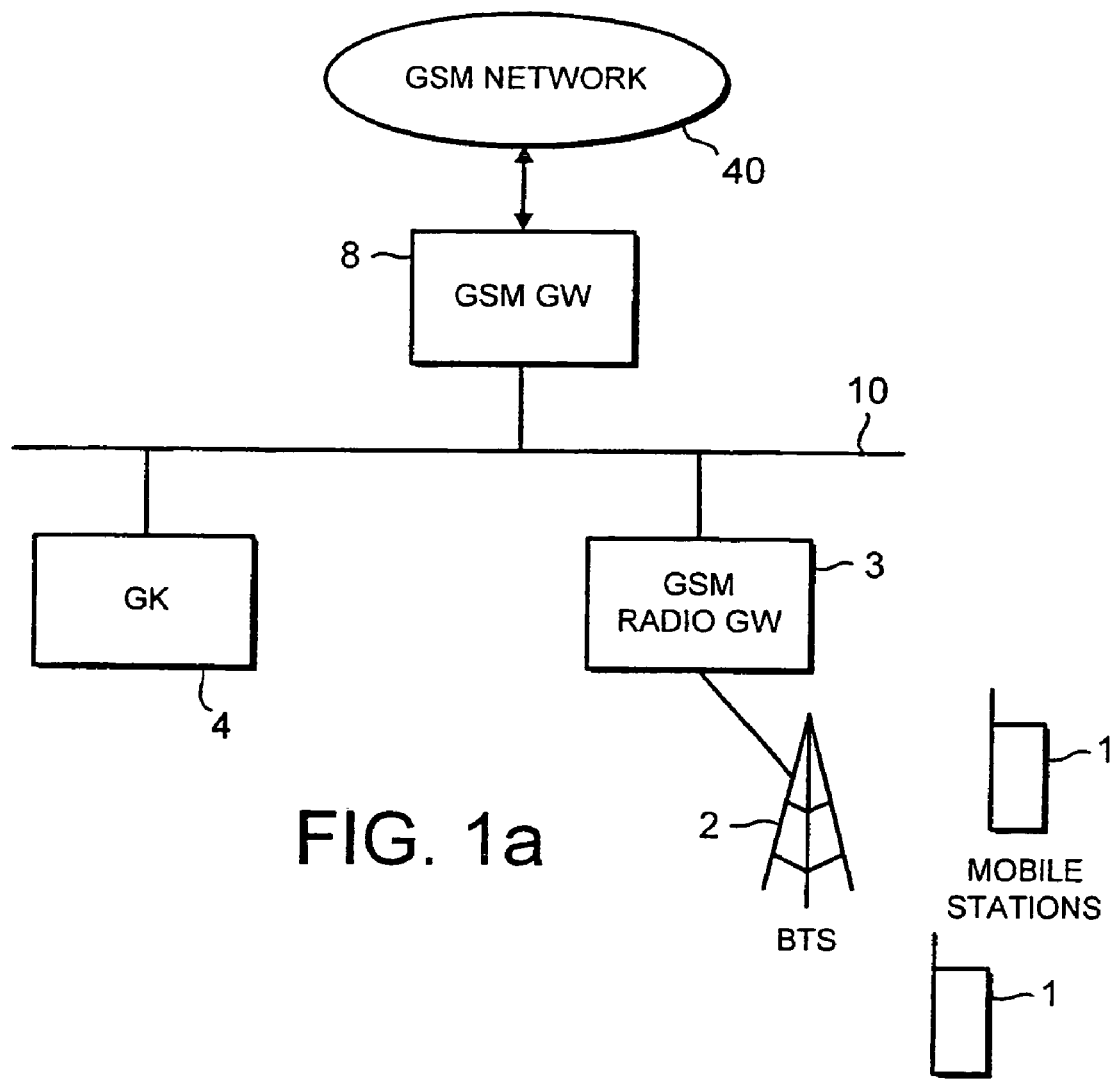
FIG. 1a is a block diagram showing some of the components used in the implementation of a WIO system.
Figure 1B:
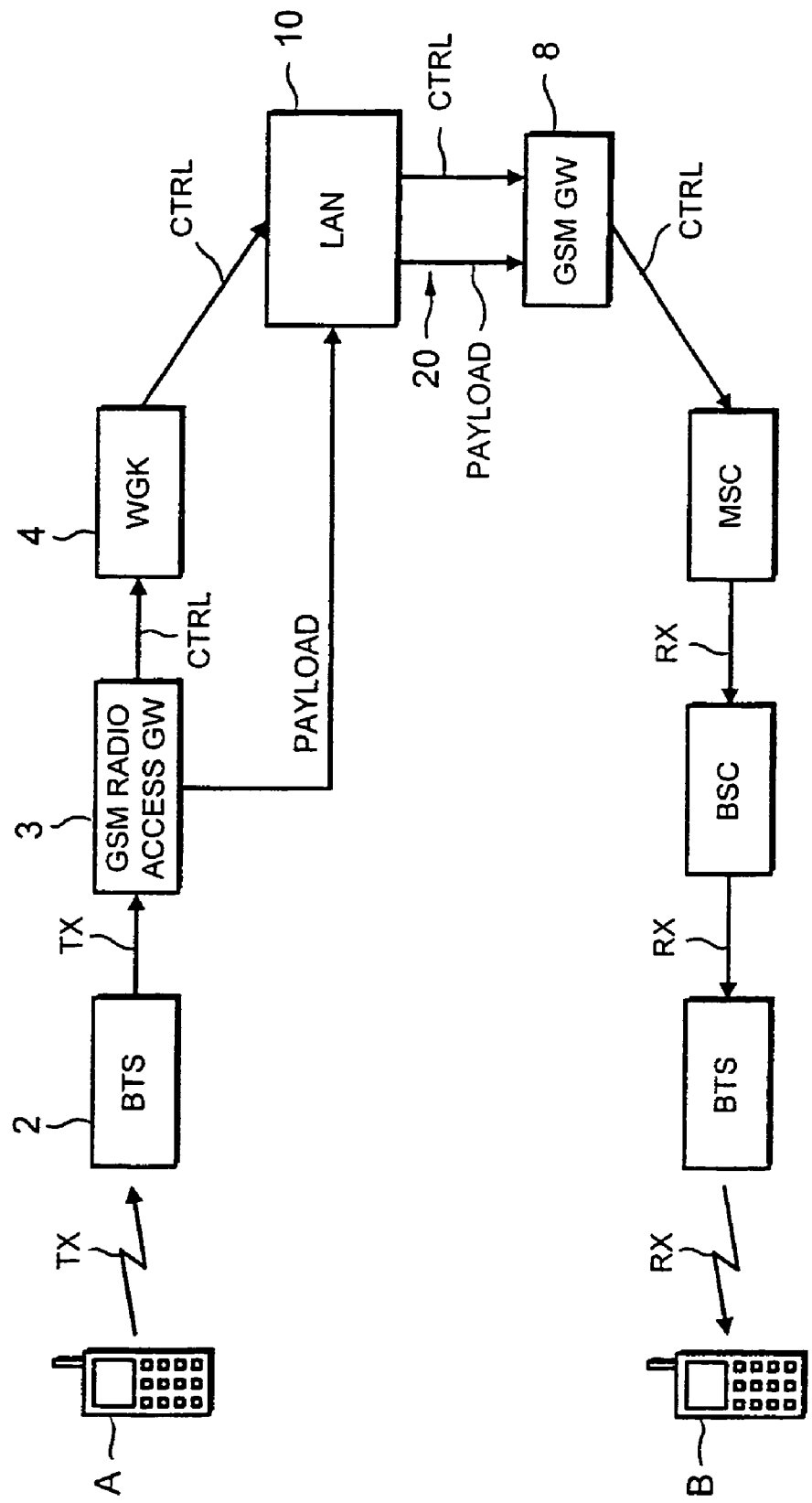
FIG. 1b is a block diagram illustrating the communication pathways used during a call between an internal mobile station and an external mobile station.

The functions of the WIO system components described above will now be described, with reference to FIG. 1b, in the context of a telephone call from a mobile station located within the WIO system (mobile A) to a mobile station located in an external network such as a GSM network (mobile B)

The mobile station A transmits a radio frequency (RF) transmission signal TX, on a predetermined RF communication channel, to the base transceiver station 2 in a format conventional to GSM communications systems such as a time-slot format. The communication channel on which the mobile station A transmits the RF transmission signal TX is determined in a manner conventional to GSM communication systems.

The base transceiver station 2 receives the RF transmission signal, down-converts it and then forwards it to the GSM Radio Access Gateway 3. In this respect, the base transceiver station 2 and the GSM Radio Access Gateway 3 operate in a manner similar to a base transceiver station and a base station controller respectively in a conventional GSM network.

The GSM Radio Access Gateway 3 receives the down-converted transmission signal from the base transceiver station 2 and converts it from the conventional GSM time-slot format, to a packet-based format which allows it to be transmitted along the LAN or IP based network. This is referred to herein as the PAYLOAD. Also, the GSM Radio Access Gateway 3 composes a control signal CTRL which includes signalling information, for example, identification of the destination mobile unit, the IP address corresponding to that mobile unit and/or identification of the source mobile unit.

The control signal CTRL is then routed, in packet format, via the LAN or IP-based network, to the Gatekeeper 4 which based on the information contained in the control signal CTRL, determines whether the mobile station B is located within the WIO system or external to the WIO system. If the mobile station B lies outside the WIO system, e.g. a conventional GSM mobile unit operating in the GSM network, the Gatekeeper 4 routes the CTRL signal to the GSM gateway 8 via LAN 10 and the corresponding PAYLOAD information is transmitted in packet format via the LAN 10 between the GSM gateway 8 and GSM Radio Access Gateway 3. The GSM gateway 8 converts the packet-based PAYLOAD to circuit-switched time slot information for the mobile services switching centre MSC. The MSC then handles the PAYLOAD and the CTRL information in a manner to a conventional GSM network.

Figure 1C:
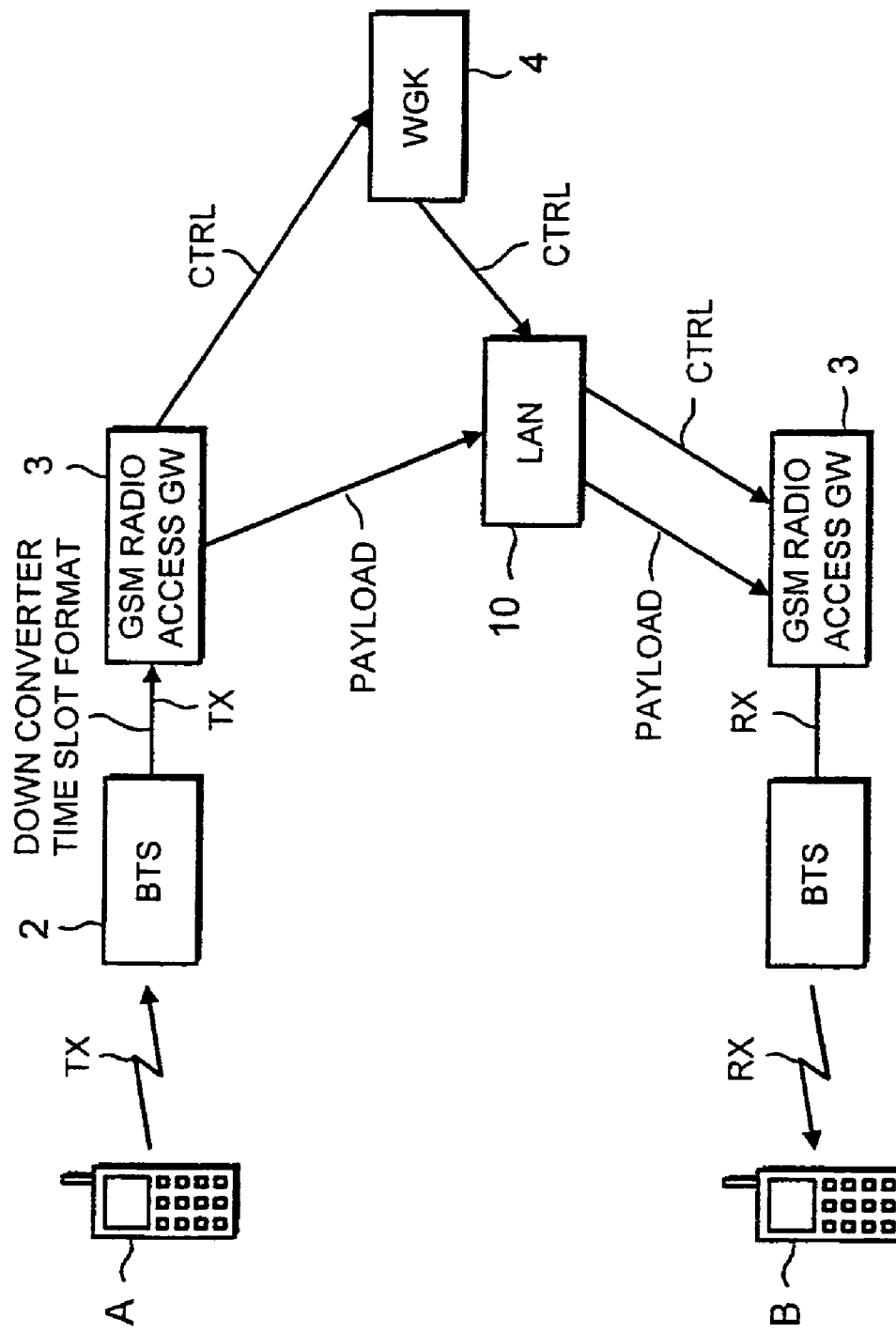
FIG. 1c is a block diagram illustrating the communication pathways used during a call between two internal mobile stations operating under the same gatekeeper.

Calls which are completely internal to the WIO system are handled slightly differently, as shown in FIG. 1c. The RF transmission signal TX, in timeslot format, transmitted by the mobile A is again sent to the BTS 2 which performs down conversion of the signal. The down-converted signal is forwarded to the GSM Radio Access Gateway 3 which performs format conversion to generate a PAYLOAD packet and a control packet CTRL. From the GSM Radio Access Gateway 3, the control signal CTRL is sent to the Gatekeeper 4 which determines if the mobile station B is within the WIO system and, if so, in which H.323 Zone it is located.

If the mobile station B is operating in the same H.323 Zone as the mobile station A, i.e. under the same Gatekeeper, the Gatekeeper 4 will receive a paging response signal from the destination GSM Radio Access Gateway, i.e. the GSM Radio Access Gateway under which the mobile station B is operating via the LAN 10, and then routes the payload along the LAN 10 to that destination GSM Radio Access Gateway 3.

The destination GSM Radio Access Gateway 3 converts the payload signal into a timeslot format. It is then sent, via its base transceiver station which performs up-conversion to RF, to the mobile station B.

Figure 1D:
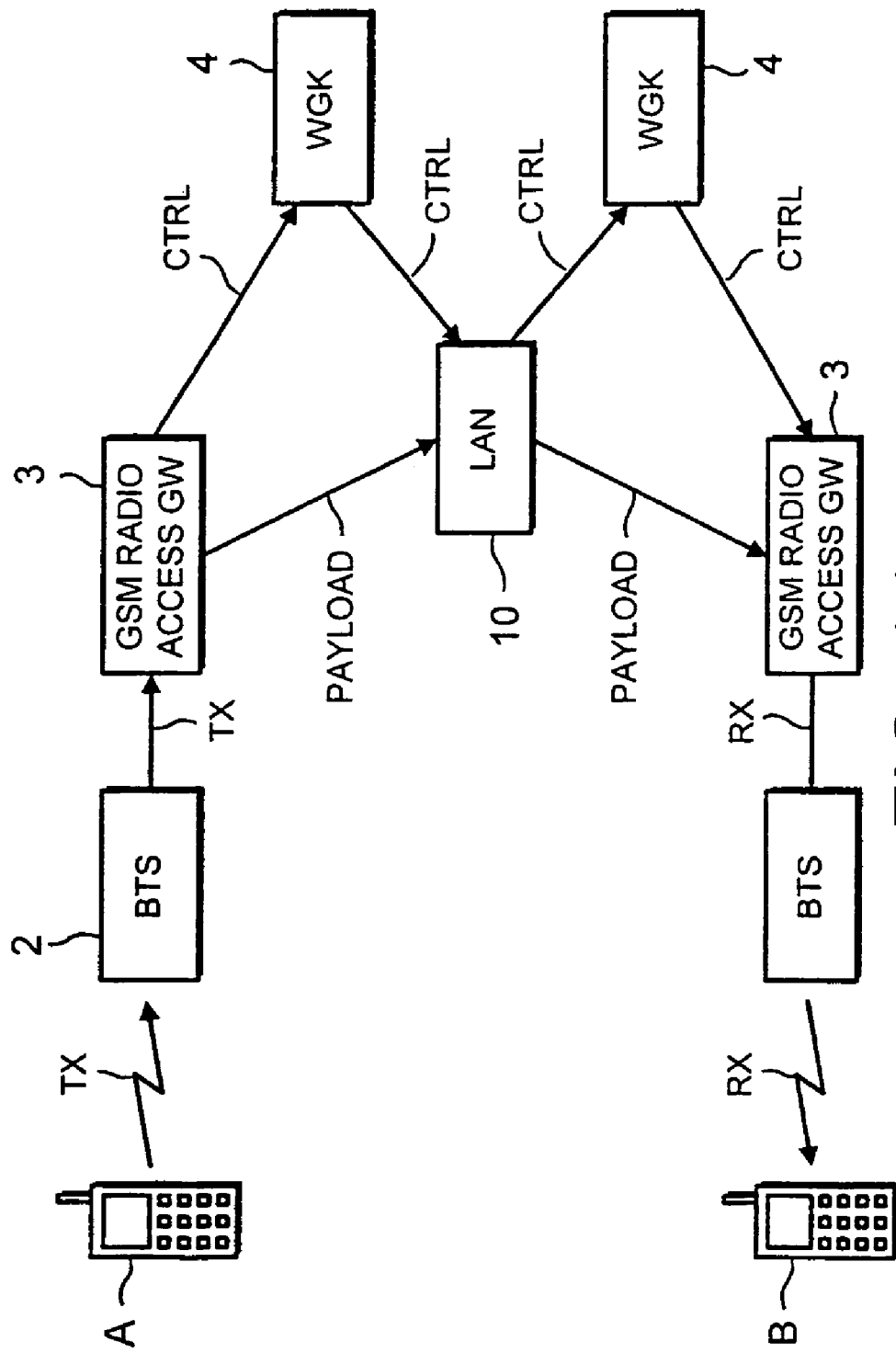
FIG. 1d is a block diagram illustrating the communication pathways used during a call between two internal mobile stations operating under different gatekeepers.

If the mobile station is in a different H.323 zone to the mobile station A, the gatekeeper 4 routes the payload signal to the destination gatekeeper 4 via the LAN 10. The destination gatekeeper 4 is the one under which the second mobile station B is operating. This scenario is shown in FIG. 1d. The destination gatekeeper 4 will also send a paging message to each GSM radio access gateway 3 under its control. If it receives an acknowledgement from one of the GSM radio access interfaces, it routes the payload signal from the source GSM radio access gateway 3 to the destination GSM radio access gateway via the LAN 10 and out to the mobile station B, via the base station as described in relation to FIG. 1c.

Figure 2:
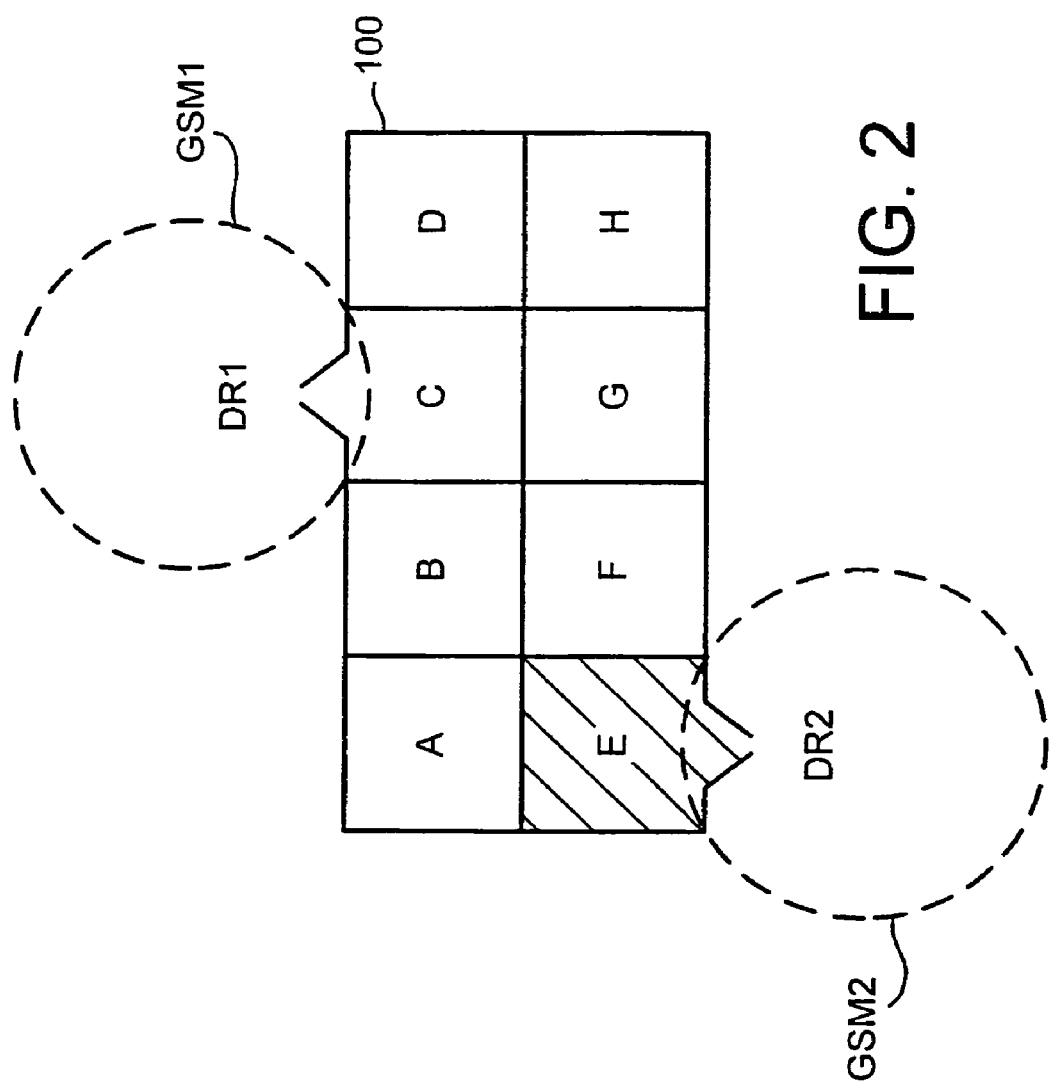
FIG. 2 shows the cellular nature of the WIO system.

FIG. 2 is a diagram showing the cellular nature of the WIO system.

Reference numeral 100 represents the office environment denoted by the same numeral in FIG. 1 and the perimeter of the box 100 may be considered to represent the wall of the office in which the WIO system is implemented.

Within the office, the WIO system provides a cellular communications network, similar to that of a conventional mobile network such as GSM. Within the office 100, therefore, there are a number of cells (A . . . H). In FIG. 2, there are 8 cells configured as squares. The number and shape of the cells implemented in the WIO system is not restricted to these characteristics, however. They are depicted in FIG. 2 in this manner for ease of representation. In fact, the shape of the cells tends to be more hexagonal than either circular or square.

The cells incorporating the entrance/exit(s) of the office (DR1, DR2)—shaded cells E and C in FIG. 2—are defined as border cells. The function of the border cells will be described later.

Outside of the WIO office 100, there may lie cells of an external network such as a GSM network. In FIG. 2 these cells are labelled GSM1 and GSM2. In reality, it is possible that the WIO office 100 will lie entirely within a cell of the external network. However, for ease of representation, the external cells are shown to be adjacent to and slightly overlapping the border cells E & C.

As described above, when a mobile station B which is operating an on-going call to a mobile station A within the WIO office 100, the call having been initiated while both mobiles were within the office, moves out of the office from exit DR2, for example, it moves into the cell GSM2 of the external network.

Since the call was initiated entirely within the WIO system, the MSC of the external network of which cell GSM2 forms a part has no knowledge of either the call or the identity of the mobile stations involved therewith. Consequently, when the mobile station B moves out of the office, its handover to the cell GSM2 will not take place until the Mobile Switching Centre has established its identity and the details of the call in which it is involved.

According to the embodiment described herein, therefore, the movement of a mobile station into one of the border cells E, C of the WIO system is used to predict if and when that mobile station will move out of the WIO system and into the external network, thus requiring an external handover.

If the mobile moves into one of the border cells of the WIO system, the system begins to generate a prediction as to the likelihood of an external handover being required and when that handover must be requested. The movement of the mobile station is determined by using, for example, timing advance information conventional to GSM systems or any other suitable technique.

By using a prediction algorithm in conjunction with one or more of a number of operating parameters listed below, the GSM Radio Access Gateway 3 predicts that a handover to a cell of the external network is likely to be required a certain time (time period tp0) in advance of the handover being required. The GSM Radio Access Gateway 3 then sends a hand-off advance request, in packet-based format, to its gatekeeper 4 which forwards this message via the LAN and the GSM gateway 8 to the mobile services switching centre of the external network.

The mobile services switching centre is able then to begin preparations for the handover of the mobile station before an actual handover requirement is determined by the GSM Radio Access Gateway.

In order to generate a prediction as to the likelihood of a possible handover of a mobile to an external network, the prediction algorithm used in the GSM Radio Access Gateway takes into account one or more of the following operating parameters specific to the mobile station:
1) The distance of the mobile station from the edge of the border cell;
2) The strength of the signal received by the mobile from the border cell's base transceiver station; and
3) The strength of the signal received by the mobile from the external cell's base transceiver station.

The prediction algorithm uses the above parameters and, based on a probability estimation of a handover being requested by the mobile station, generates an advance handover request earlier than the actual handover request.

For "normal" handovers, i.e. handovers between two cells of the WIO system, the GSM Radio Access Gateway 3 sends a handover request message to the Gatekeeper 4 according to predetermined environment reported by the mobile station satisfying a threshold level T1. These may include the relative difference between the level of the received signal transmitted by the current base transceiver station and the level of the received signal being transmitted by a base transceiver station in a different cell reaching a threshold level TL1.

In the present embodiment, the likelihood of a handover being required is predicted and a hand-off advance request is issued if the value generated by the prediction algorithm exceeds a predetermined threshold level T2. As in the case of a "normal" handover described above that value is itself determined by the individual values of one or more of the above listed parameters.

For example, subject to no other overriding parameters, the relative difference between the received signal level of the current base transceiver station and the received signal level of a base transceiver station in a different cell may need to exceed a lower threshold level, TL2, before the prediction algorithm generates a value which exceeds the threshold value T1 required for a hand-off advance message. In other words, the threshold level TL2 for the signal level parameter used, among other parameters, by the prediction algorithm to predict that a handover is likely, is reached before the threshold level TL1 used by the mobile to determine that a handover is required.

The relative strengths of the signals transmitted by the current base transceiver station and the base transceiver station of the external cell, together with other information such as the speed and direction of motion of the mobile station through the border cell, allows the prediction algorithm to determine that an external handover is likely to be required some time (time period tp0) before the mobile itself determines that such a handover is actually required. Thus the external controller can set up a communication channel in the GSM network ready for the mobile station if it does issue a handover request.

Figure 3:
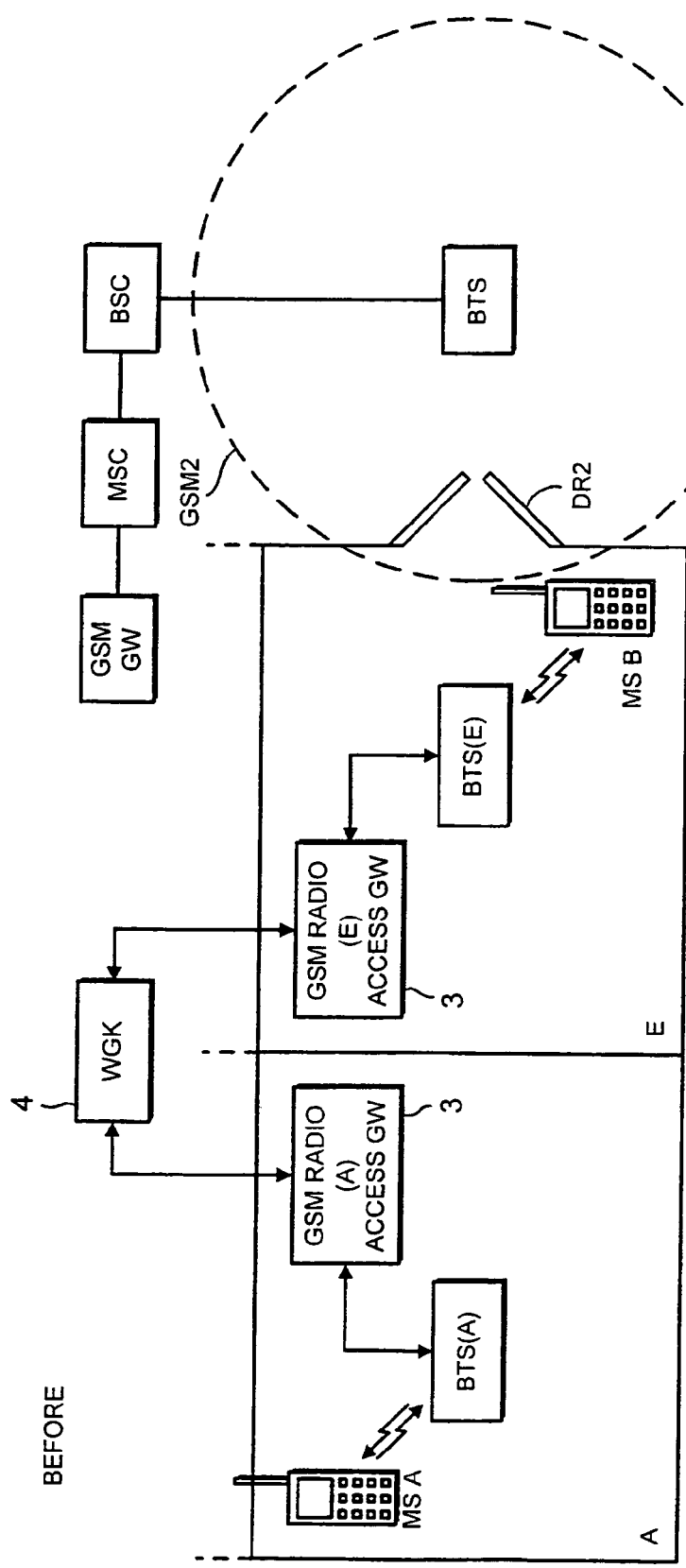
FIG. 3 is a block diagram illustrating the communication pathways between components of the WIO system and the GSM network before the mobile.
Figure 4:
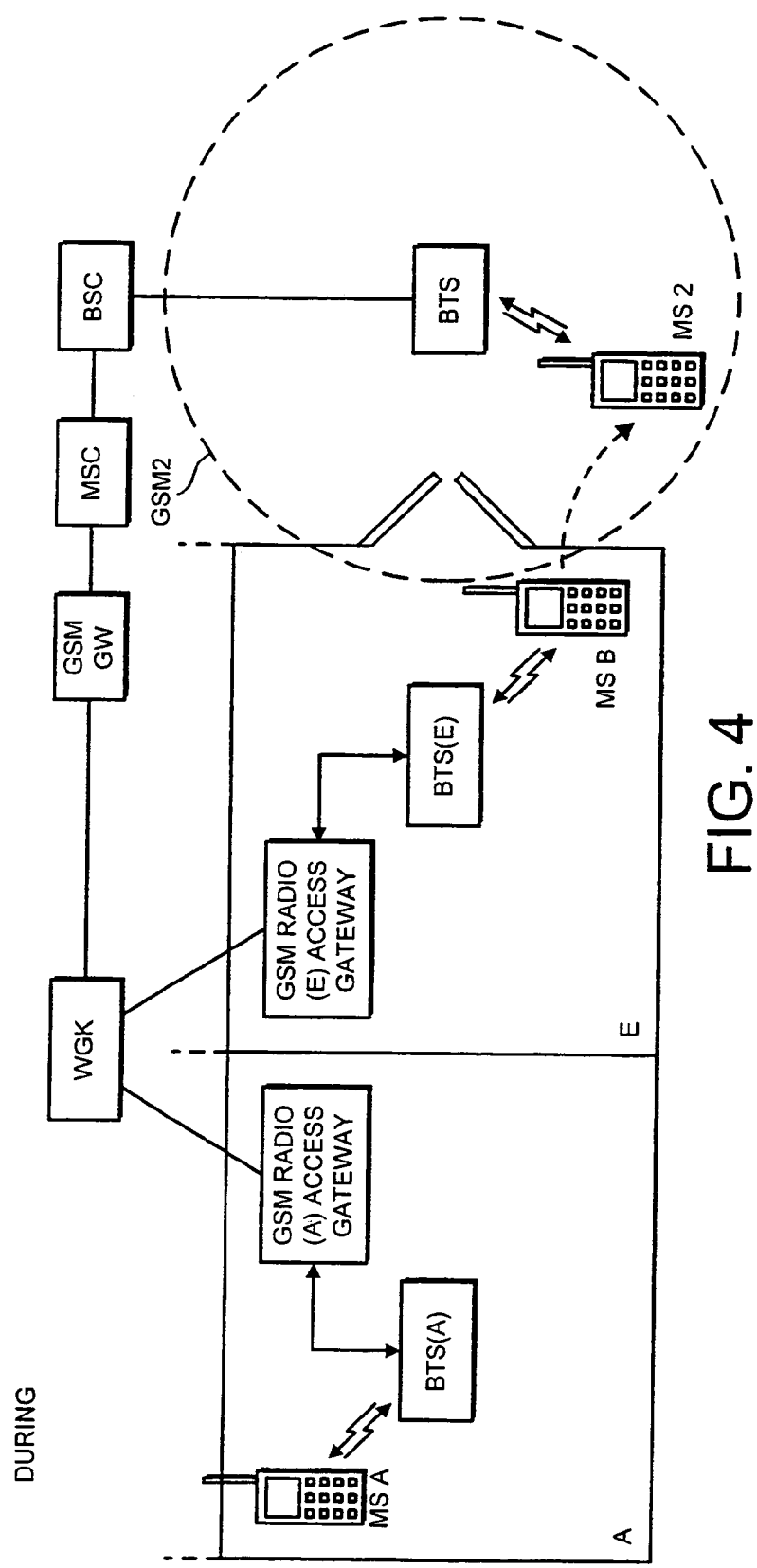
FIG. 4 is a block diagram illustrating the communication pathways between components of the WIO system and the GSM network during the mobile handover.
Figure 5:
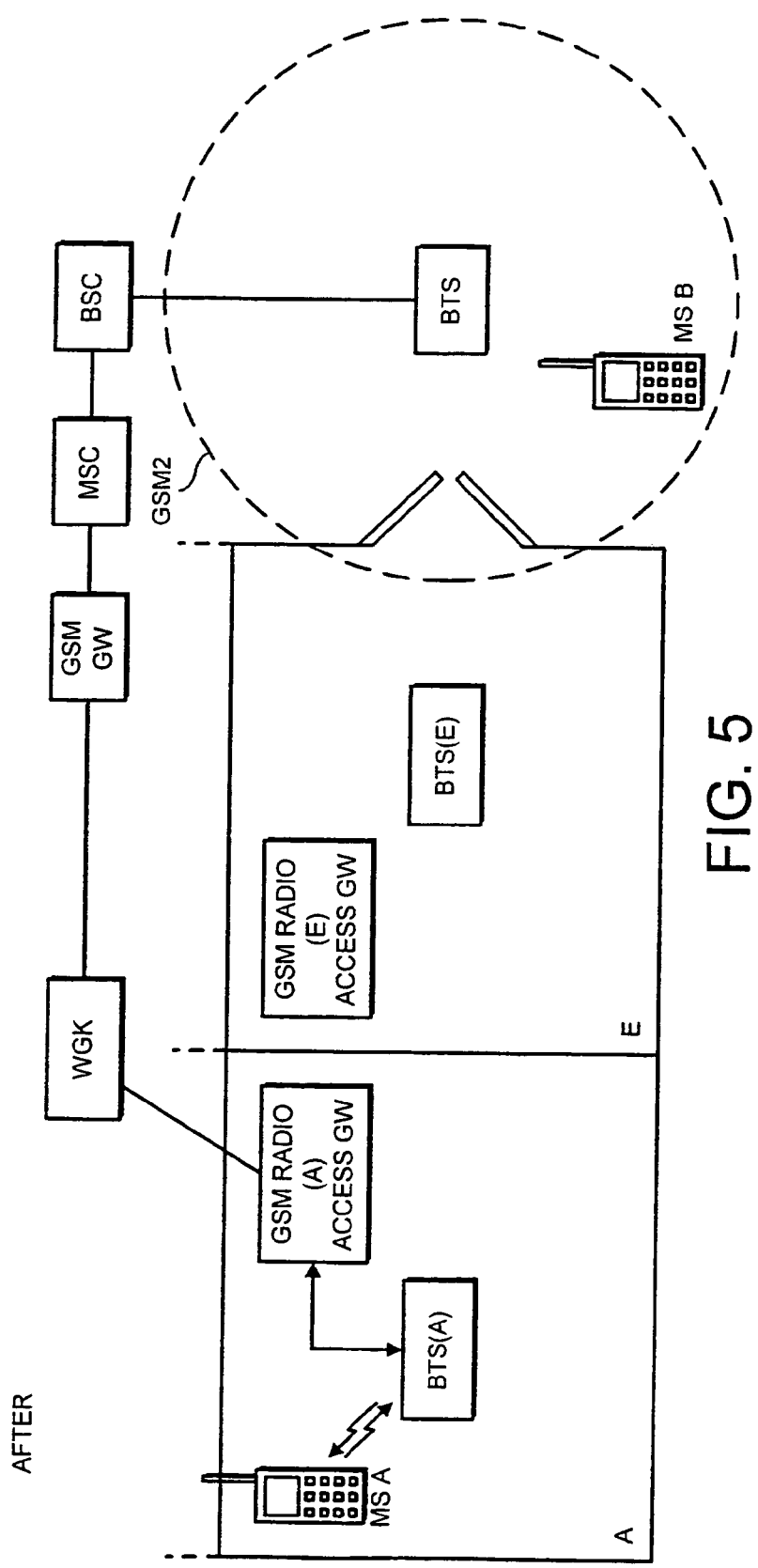
FIG. 5 is a block diagram illustrating the communication pathways between components of the WIO system and the GSM network after the mobile handover.

FIGS. 3, 4 and 5 show, respectively, the communication pathways before, during and after a handover. The following description illustrates the handover of mobile station B located in border cell E to external cell GSM2 whilst in communication with mobile station A located in cell A.

In this context, the components of cell E, i.e. the cell out of which mobile station B will move, are termed the source components while the components of cell GSM2, i.e. the cell into which mobile station B will move are termed the target components.

Before the handover (FIG. 3), mobile station B communicates with mobile station A by transmitting an RF, timeslot-based signal to the source base transceiver station which down-converts the signal and sends it to the source GSM Radio Access Gateway 3. The source GSM Radio Access Gateway 3 converts the signal into a packet-based format and sends it, via the IP-LAN 10, to the gatekeeper 4. The gatekeeper 4 identifies the destination mobile station as mobile station A and then sends the packet-based signal, via the IP-LAN 10, to the GSM Radio Access Gateway 3 of mobile station A. The GSM Radio Access Gateway 3 converts the signal back into GSM timeslot format and forwards it to its base transceiver station which up converts the signal to RF and transmits it to mobile station A.

While the mobile station B is within the border cell E, the source GSM Radio Access Gateway, using one or more of those parameters 1) to 3) listed above in conjunction with a prediction algorithm, generates a prediction as to the likelihood of a handover of the mobile station B from border cell E to external cell GSM2 being required.

When the required threshold level T2 of the value generated by the prediction algorithm is met, for example threshold TL2 is reached and it is determined that the mobile station B is moving towards the exit and is likely to require a handover to the GSM network, the source GSM Radio Access Gateway 3 issues a hand-off advance request which is sent to the gatekeeper 4.

The gatekeeper forwards this message in packet format via the LAN 10, to the GSM gateway. The GSM gateway converts the handover required indication message into a format recognised by the GSM mobile switching centre, such as a timeslot format, and sends it to the mobile switching centre.

The mobile switching centre then begins to set up the required communications links necessary to set up a "dummy" call (FIG. 4). In particular, a communication link for the control signals are established between the GSM Radio Access Gateway, the gatekeeper, the GSM gateway and the mobile switching centre.

When the mobile station B moves nearer the exit of border cell E and the signal level of the base transceiver station of cell GSM2 reaches threshold level T1, a normal external call is set up (although the mobile station is still inside the WIO) and then a handover request is issued. When handover is about to be performed the "dummy" call is established and the internal call is released. A normal GSM handover procedure is then effected. The payload is transferred between mobile B and mobile A via the GSM Radio Access Gateway, the GSM gateway and the MSC just before handoff. The MSC handles the handover.

The source GSM Radio Access Gateway sends the handover request to the gatekeeper who instructs the mobile station A to execute the handover and then connects the signals from the GSM gateway to the destination base station controller and disconnects the signals from the source GSM Radio Access Gateway. At this point, the handover is considered to be completed (FIG. 5).

In this manner, the mobile station B is handed over from the border cell E of the WIO system into a cell GSM2 of an external network. Since the external network has advance notification of the handover, by virtue of the prediction generated by the source intranet mobile cluster interface, the required communications links necessary to execute the handover can be set up. When, and only when, those links have been set up will the gatekeeper instruct the mobile station to execute the handover.

Thus, breaks in the packet stream are minimised reducing packet loss and improving communications links.

Figure 6:
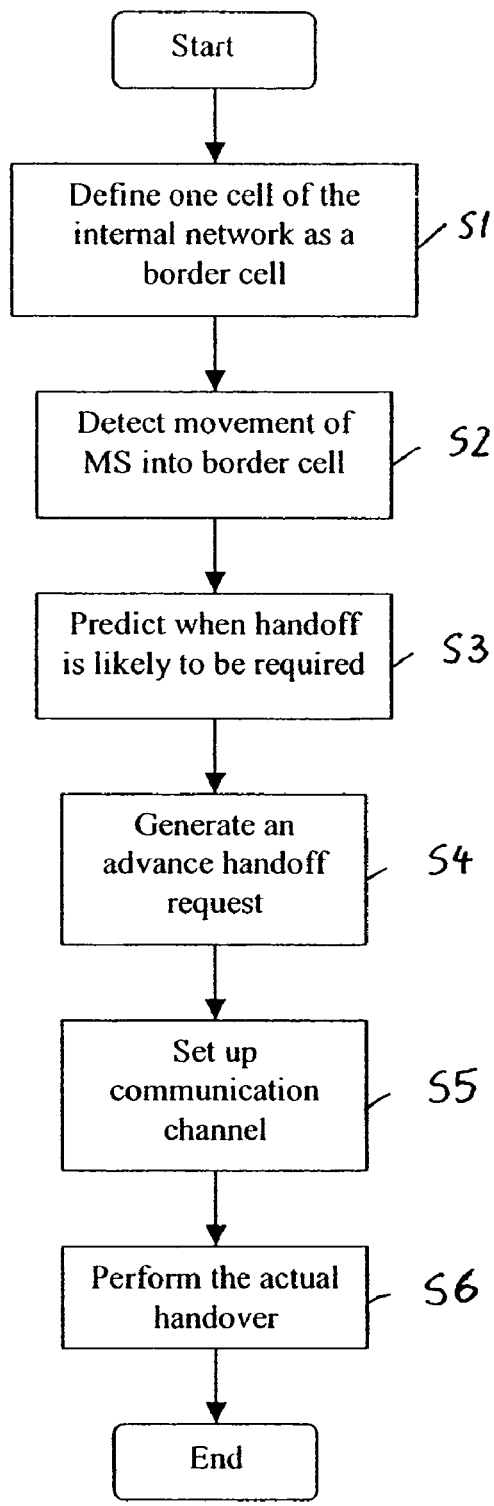
FIG. 6 is a flow diagram showing the steps for a mobile handover from a WIO system to a GSM network.

FIG. 6 shows a flow diagram of the steps for effecting the handover depicted in FIGS. 3–5. In step S1, at least one cell of the internal cellular network is defined as a border cell. At step S2, the movement of the mobile station into the border cell is detected by the WIO system. In step S3, the WIO system uses a prediction algorithm to determine when a handoff is likely to be required and generates an advance hand-off request, step S4, which is sent to the MSC of the external network when it is determined that a handoff is likely. This allows the MSC to set up a communication channel in the external network for the handover in response to the advance hand-off request before an actual handover requirement is required, step S5. When the actual handover is required, it can be effected quickly, step S6.

What is claimed is:

1. A method of handing off a mobile station from an internal cellular communications network to an external mobile cellular communications network, the internal network being a packet switched network having a network controller, wherein the method comprising:
   allocating at least one cell of the internal cellular network as a border cell, the at least one cell being adjacent cells of the external cellular network;
   detecting the movement of said mobile station into said border cell;
   when said mobile station is in the border cell and before a hand-off requirement is determined, predicting using a prediction algorithm that an actual handoff is likely to be required using a set of predetermined parameters associated with said mobile station;
   generating an advance hand-off request when the prediction algorithm predicts that the actual hand-off is likely to be required; and
   setting up a communication channel in the external network in response to said advance hand-off request before the hand-off requirement for said mobile station is determined, said communication channel being ready for use by said mobile station when an actual hand-off is made.

2. The method according to claim 1, wherein said network controller implements the actual hand-off to said communication channel in response to an actual hand-off request.

3. The method according to claim 1, wherein said mobile station is in communication with a base transceiver station in the internal cellular communications network prior to hand-off.

4. The method according to claim 3, wherein said predetermined parameters for use by said prediction algorithm includes timing advance information reported from the base station to the mobile station.

5. The method according to claim 1, wherein the network controller performs said steps of predicting and generating.

6. The method according to claim 5, wherein said hand-off advance request is issued in packet format via a packet communication path from the network controller to a network controller of said external network.

7. A network controller for use in an internal cellular communications network, said internal network is a packet switched network and comprises a plurality of cells and including at least one border cell, said at least one border cell being adjacent cells of an external mobile cellular communications network having an external network controller, the internal network controller comprising:
   means for detecting the movement of said mobile station into said border cell;
   means for predicting, using a prediction algorithm, that an actual handoff is likely to be required using a set of predetermined parameters associated with said mobile station when said mobile station is in the border cell and before the actual handoff is required;
   means for selectively issuing a hand-off advance request when the means for detecting detects said mobile station in the border cell and said means for predicting predicts that a hand-off is likely to be required in accordance with the prediction algorithm.

8. An internal cellular communications network, said internal network is a packet switched network and comprises a plurality of cells and including at least one border cell, said at least one border cell being adjacent cells of an external mobile cellular communications network having an external network controller, the internal cellular communication network comprising:
   means for detecting the movement of said mobile station into said border cell;
   means for predicting, using a prediction algorithm, that an actual handoff is likely to be required using a set of predetermined parameters associated with said mobile station when said mobile station is in the border cell and before the actual handoff is required;
   means for selectively issuing a hand-off advance request when the means for detecting detects said mobile station in the border cell and said means for predicting predicts that a hand-off is likely to be required in accordance with the prediction algorithm; and means for setting up a communication channel in the external communications network in response to said advance hand-off request and before the actual hand-off is required for said mobile station such that said communication channel is ready for use by said mobile station when an actual hand-off request is made.

9. The network controller according to claim 7, wherein said external network controller is in communication with said internal network controller by a packet communication path for transmission of said hand-off advance request.

10. The method according to claim 2, wherein said mobile station is in communication with a base transceiver station in the internal cellular communications network prior to hand-off.

11. The method according to claim 2, wherein the internal cellular communications network comprises an internal network controller which carries out the prediction and issues said hand-off advance request.

12. The method according to claim 3, wherein the internal cellular communications network comprises an internal network controller which carries out the prediction and issues said hand-off advance request.

13. The method according to claim 4, wherein the internal cellular communications network comprises an internal network controller which carries out the prediction and issues said hand-off advance request.

14. The network controller according to claim 8, wherein said external network controller is in communication with said internal network controller by a packet communication path for transmission of said hand-off advance request.

15. The network controller according to claim 8, comprising a base transceiver operable to set up an RF communication channel with said mobile station.

* * * * *